Nov. 24, 1970 H. H. WOLFF 3,542,948

PANORAMIC DISPLAY SYSTEM

Filed April 17, 1968 2 Sheets-Sheet 1

INVENTOR.
Hanns H. Wolff
BY John F. Miller Agent
John M. [illegible]
Attorney

INVENTOR.
Hanns H. Wolff
BY John F. Miller Agent
John M. Pease Attorney

United States Patent Office 3,542,948

Patented Nov. 24, 1970

3,542,948

PANORAMIC DISPLAY SYSTEM

Hanns H. Wolff, Orlando, Fla., assignor to the United States of America as represented by the Secretary of the Navy Filed Apr. 17, 1968, Ser. No. 721,974
Int. Cl. H04n *3/28, 7/08*
U.S. Cl. 178—6 7 Claims

ABSTRACT OF THE DISCLOSURE

A plurality of television cameras fixed to a first rotating drum scan through respective narrow slits or the like, positioned with the long dimension approximately perpendicular to the plane of rotation to furnish video information to respective projectors on a second drum which rotates in synchronism with the first. The projectors scan in a direction approximately normal to their plane of rotation whereby a scene covering a 360 degree field of view may be projected.

BACKGROUND OF THE INVENTION

The invention is in the field of television presentation systems. It is particularly suitable for use in television type simulators of the kind used in training devices.

In the prior art various projection systems have been employed to try to fill the need for a device which can present a scene on a wide angle field. While various expedients have been tried, none of the prior art devices have achieved a practicable presentation of a 360 degree field of view. Such limited "wide angle" presentation devices as have been developed suffer from various deficiencies such as distortion, low light intensity, limited view, excessive complexity, size, weight, costs, inefficiency, etc. The present invention overcomes these deficiencies with a simple, compact, and relatively inexpensive apparatus for projecting a scene on a 360 degree screen with excellent definition, brightness, and clarity.

SUMMARY OF THE INVENTION

A plurality of television cameras are mounted on a horizontal rotating drum so that each scans a 360 degree field of view. The video outputs of the cameras are forwarded to a like plurality of television projectors which are mounted on a similar projector drum which rotates in synchronism with the camera drum. The television projectors may project a view onto any suitable medium, for example, on a concentric 360 degree cylindrical or spherical screen surrounding the projector drum. The cameras and projectors scan a narrow approximately vertical line electronically while the rotational motion of the drums effects horizontal scanning. Interlaced scanning is attained by combining the projectors into groups providing interspaced scanning paths. The drums are not limited to rotation in the horizontal plane but could rotate in any plane. The electronic scanning direction is determined by the plane of rotation and should be approximately perpendicular thereto.

DESCRIPTION OF THE PREFERRED EMBODIMENT

This invention relates to apparatus for making a visual presentation, especially of the environment over a wide-angle field extending up to a full 360 degrees of azimuth.

This invention uses a mechanically rotating projection system that is associated with a mechanically rotating pick up system. Both systems scan electronically in a direction approximately parallel to the axis of rotation. For example, if rotation is in a horizontal plane, electronic scanning is approximately vertical.

Figure 1:
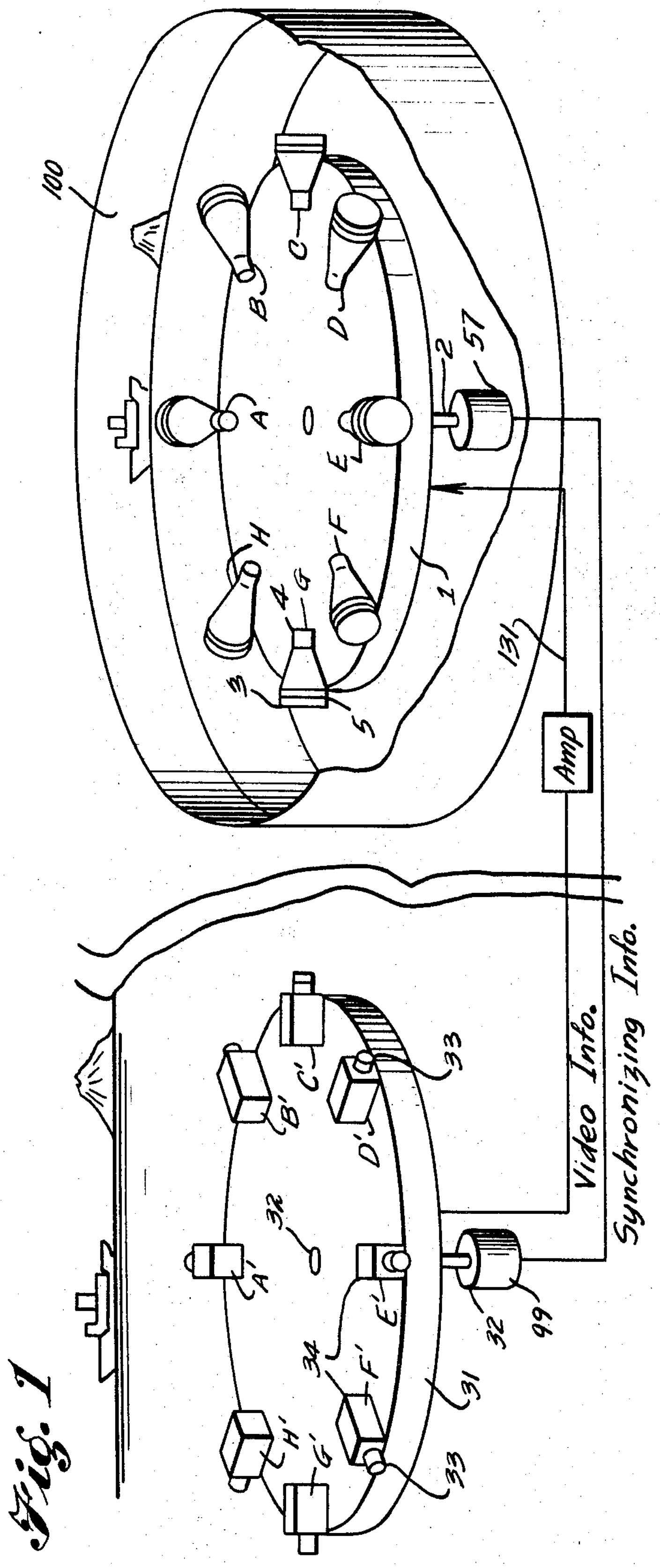
FIG. 1 illustrates the principles of the invention.
Figure 3:
FIG. 3 shows a cathode ray tube and lens arrangement for projecting video information.

The projection apparatus of this presentation system is shown in FIGS. 1 and 3. A drum 1 with a center shaft 2 is driven by a preferably synchronous motor 57. The drum carries, by way of example, eight lens systems 3 that project the visual presentations appearing on the screens 5 of eight respectively associated cathode ray tubes 4. FIG. 3 shows a lens and its associated cathode ray tube which together comprise a projection channel. The cathode ray tubes 4 are scanned electronically in a direction approximately parallel to the rotational axis of the drum while displacement in a direction approximately normal to this scan is achieved by the rotation of the drum.

It can be seen that if the intensity of the beam of the cathode ray tube 4 is modulated to represent the presentation characteristics, a 360 degree presentation can be achieved.

The eight channels shown on drum 1, by way of example, are provided to keep the band width requirement for the video amplifier for the cathode ray tube 4 at a practicable level.

These eight channels, designated by the letters A, B, C, D, E, F, G, and H, can be operated in different fashions. If the drum rotates at, for example, five revolutions per second, in a counter-clockwise direction as shown in FIG. 1, channel C will advance to the position of channel A in one-twentieth of a second. Channels A, C, E, and G can be modulated in such manner that they always present the same group of scanning lines. The same holds true for the channels B, D, F, and H.

If the scanning lines of this second group are displaced with reference to the scanning lines of the first group so that the scanning lines of each group are interspersed between the scanning lines of the other group, an interlaced scanning system is achieved with a frame rate of twenty per second and a field rate of forty per second.

It should be understood that the four channels of one group at any instant represent and display different points in the presentation in contradistinction to regular television presentation which scans with a single beam which is modulated by a single video channel. Therefore, eight intensity inputs must be provided for the projection apparatus of the invention. An eight channel pickup system as shown in FIG. 1 can be used.

The pickup system comprises the rotating drum 31 with an axial shaft 32 which is driven by, for example, a motor 99 in synchronism with the drum 1 of the display system.

Figure 2:
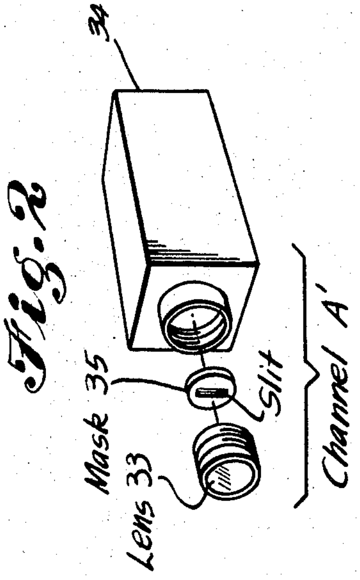
FIG. 2 shows the arrangement of a camera-mask-lens combination.

The drum 31 carries eight lens systems 33 that are respectively associated with eight television cameras 34 and eight masks or equivalent optical means 35 in the manner shown in detail in FIG. 2.

Figure 4:
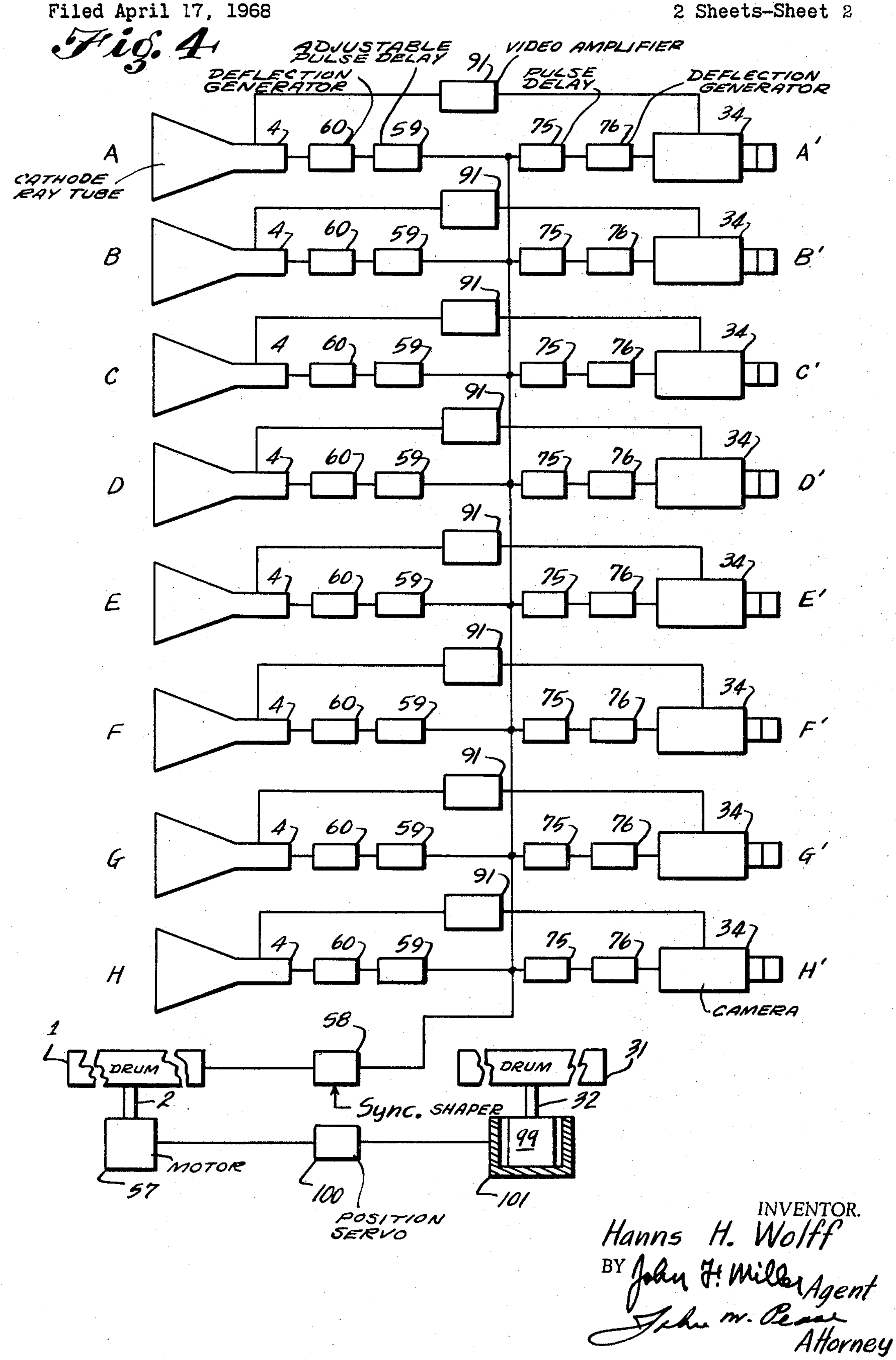
FIG. 4 shows the circuitry of the invention.

The video signals generated by cameras 34 are fed by suitable means, e.g., slip rings, and the cable 131 to respective cathode ray tubes 4 on drum 1. FIG. 2 shows the narrow slit in mask 35 which restricts the view of the environment projected on the screen of camera 34 by lens 33. The width of the slit should perferably be such that only a fraction of an equivalent display line width is projected on the screen of camera 34 so as to limit the smear resulting from the rotation of the lens system to approximately the width of one display line. FIG. 4 shows a block diagram of the invention. Synchronization signals are derived from the rotating drum 1 in a conventional manner, for example, optically with an optical electrical conversion, or directly electrically. The sync signals are fed into a shaping circuit 58 which releases shaped sync pulses to each of the eight channels.

The shaped sync pulse released from 58 is fed to a respective adjustable pulse delay 59 in each of channels A–H. 59 releases a sync pulse to a respective deflection generator 60 in each of channels A–H which in turn deflects the beam of the cathode ray tube 4. The pulse delays 59 are adjustable to make an adjustment for the correction of optical alignment deficiencies possible. Delays 59 also make adjustment of the interlace operation for the interlacing channels possible. A corresponding set of adjustable pulse delays 75 is provided in the $A^1$, $B^1$, $C^1$, $D^1$, $E^1$, $F^1$, $G^1$, and $H^1$ channels of the pickup system for the adjustment of alignment deficiencies of the optical systems and of the interlace delay. The pulse delays 75 control the deflection signal generators 76, respectively.

The pickup channels are provided with respective video amplifiers 91 which amplify the signals derived from the cameras 34 to control the intensities of the respective cathode ray tubes 4. To control the synchronism between the rotating drum 1 and the rotating drum 31, a sync conversion system 100 is provided that may, for example, control the position of a rotatable stator 101 of motor 99.

The number of channels and the interlace operation is given only as an example.

Depending on desired channel bandwidth, rotating speed, cathode ray tube screen persistence, object motion speeds and other parameters, the number of channels may be smaller or larger. Furthermore, the interlace action, if used, may be selected as a triple or quadruple or super interlace if desired.

Instead of using single interlace a higher lever interlace pattern may be used which would have the effect of raster shifting and thereby reduce the visibility of scanning lines. For example, in an eight channel system as described, channels A and E, B and F, C and G, D and H may be paired to achieve a triple interlace scanning system.

The scanning of both the cameras 34 and the cathode ray tubes 4 is performed at a slight angle to a parallel to the axis of rotation. This angular displacement serves to generate axis parallel scans in both cameras 34 and cathode ray tubes 4 while their respective drums are rotating and is defined by the time required for the scanning beams of the cameras and the cathod ray tubes to travel from top to bottom (or vice versa) and by the rotational speed of the drums 1 and 31.

The projection apparatus of this invention is not limited to use with the pickup system disclosed but could be employed with any known information supplying means. For example, the projection apparatus could be supplied with prerecorded information from a recorder or equivalent means. It could be operated with information stored in a computer and/or developed during the course of computer operations.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. In a television presentation system the improvement comprising:

a rotating drum, a plurality of projection means fixed to said drum, means for causing said projection means to scan electronically in a direction approximately perpendicular to the plane of rotation of said drum, whereby information supplied to said projection means may be projected in visual form, said plurality of projection means being arranged into a plurality of groups, the projection means of each group being modulated in such manner that the projection means of a particular group always present the same group of scanning lines, the scanning lines of one group being displaced with reference to the scanning lines of another group so that the scanning lines of each group are interspersed between the scanning lines of another group whereby interlaced scanning is achieved, and a plurality of intensity inputs connected to provide a separate intensity input to each respective projection means.

2. The apparatus of claim 1 wherein each of said projection means comprises a cathode ray tube and a respective lens system positioned adjacent thereto for projecting information developed by said cathode ray tube.

3. The apparatus of claim 2 and including a screen surrounding said drum for displaying said information.

4. The apparatus of claim 3 and including a second rotating drum, a plurality of television cameras fixed to said second rotating drum, the number of cameras being equal to the number of projection means, means causing said cameras to scan electronically in a direction approximately perpendicular to the plane of rotation of said second drum, and means connecting each of said cameras to a respective one of said projection means whereby video information from said cameras is projected by said projection means.

5. The apparatus of claim 4 and including a plurality of lens systems, each of said lens systems being positioned adjacent a respective one of said cameras to pass information thereto, and a mask interposed between each of said lens systems and its respective camera, each said mask having a narrow slit therein to limit the field of view of said camera.

6. The apparatus of claim 5 and including sync pulse generating and shaping means, a respective adjustable pulse delay means for each of said cathode ray tubes and/or said cameras, a respective deflection generator for each of said cathode ray tubes and said cameras, means connecting said sync pulse generating and shaping means to each of said deflection generators through a respective one of said adjustable pulse delays whereby sync pulses sent to said deflection generators may be adjustably delayed to thereby adjust the system to compensate for any optical misalignment and for optimum interlacing operations.

7. The apparatus of claim 6 wherein each of said rotating drums is rotated by a respective motor, one of said motors having a rotatable stator, a sync conversion system connected to said motors to control the position of said rotatable stator, whereby the rotation of said drums is synchronized.

References Cited

UNITED STATES PATENTS

| | | | |
|---|---|---|---|
| 2,058,681 | 10/1936 | Gould | 178—6.5 |
| 2,068,410 | 1/1937 | Hanke | 352—69 |
| 2,979,832 | 4/1961 | Klemperer | 178—6.8 |

ROBERT L. GRIFFIN, Primary Examiner

H. W. BRITTON, Assistant Examiner

U.S. Cl. X.R.

178—6.5, 7.7